(12) United States Patent
Grenvik (10) Patent No.: US 10,112,788 B2
(45) Date of Patent: Oct. 30, 2018

(54) SWEEP AUGER APPARATUS

(71) Applicant: Mid-Columbia Producers, Moro, OR (US)

(72) Inventor: Brad Grenvik, Moro, OR (US)

(73) Assignee: Mid-Columbia Producers, Moro, OR (US)

( * ) Notice: Subject to any disclaimer, the term of this patent is extended or adjusted under 35 U.S.C. 154(b) by 0 days.

(21) Appl. No.: 15/411,893

(22) Filed: Jan. 20, 2017

(65) Prior Publication Data

US 2018/0208415 A1     Jul. 26, 2018

(51) Int. Cl.
  *B65G 33/10*     (2006.01)
  *B65G 65/46*     (2006.01)

(52) U.S. Cl.
  CPC ........... *B65G 65/466* (2013.01); *B65G 33/10* (2013.01)

(58) Field of Classification Search
  CPC ...... B65G 33/10; B65G 47/82; B65G 65/466; B65G 65/22; B65G 65/4881; B65G 65/4809
  USPC ........ 198/511, 513, 518, 589, 611, 612, 674
  See application file for complete search history.

(56) References Cited

U.S. PATENT DOCUMENTS

| | | | | |
|---|---|---|---|---|
| 3,580,548 A | * | 5/1971 | Moore | A23N 17/007 366/156.1 |
| 4,015,672 A | * | 4/1977 | Kinnison | E21B 19/087 173/160 |
| 4,645,084 A | * | 2/1987 | Deike | B25J 9/046 173/194 |
| 4,669,941 A | * | 6/1987 | West | B65G 65/466 198/518 |
| 5,098,247 A | * | 3/1992 | Campbell | B65G 65/22 414/321 |
| 5,238,346 A | * | 8/1993 | Grathoff | B65G 67/606 198/611 |
| 5,450,986 A | * | 9/1995 | Toschi | B65G 65/4881 222/240 |
| 5,630,477 A | * | 5/1997 | Minatre | E21B 7/02 173/147 |
| 5,639,200 A | * | 6/1997 | Jiskoot | B65G 65/466 198/510.1 |
| 6,000,154 A | * | 12/1999 | Berard | E02F 3/3622 37/468 |
| 8,307,973 B2 | * | 11/2012 | Pelagatti | B65G 33/06 198/459.3 |
| 8,701,868 B2 | * | 4/2014 | Hall | A01D 87/00 198/313 |

(Continued)

*Primary Examiner* — Joseph A Dillon, Jr.
(74) *Attorney, Agent, or Firm* — Lee & Hayes, PLLC (57) ABSTRACT

A sweep auger apparatus includes an attachment plate having a first and second sides. The first side has attachment features to attach the attachment plate to mobile equipment. A first rotatable shaft is secured to the second side of the attachment plate. A central axis of the first rotatable shaft extends in a first direction. A first motor is connected to the first rotatable shaft to cause the first rotatable shaft to rotate. An auger support member is connected to the first rotatable shaft so as to rotate with a rotation of the first rotatable shaft. A second rotatable shaft is secured to the auger support member, and a central axis of the second rotatable shaft extends in a second direction that is transverse to the first direction. A second motor is connected to the second rotatable shaft to cause the second rotatable shaft to rotate, thereby rotating an auger.

6 Claims, 6 Drawing Sheets

(56) References Cited

U.S. PATENT DOCUMENTS

| | | | | |
|---|---|---|---|---|
| 9,212,974 | B2* | 12/2015 | Russell | G01N 1/02 |
| 2006/0245864 | A1* | 11/2006 | Epp | B65G 65/466 |
| | | | | 414/310 |
| 2008/0116039 | A1* | 5/2008 | Ainsworth | B27N 3/14 |
| | | | | 198/657 |
| 2010/0224746 | A1* | 9/2010 | Johnson | E21B 7/008 |
| | | | | 248/205.1 |
| 2013/0327159 | A1* | 12/2013 | Russell | G01N 1/02 |
| | | | | 73/863.01 |
| 2016/0242357 | A1* | 8/2016 | Mastalir | A01D 51/005 |
| 2018/0077873 | A1* | 3/2018 | Errazquin | B65G 65/22 |

* cited by examiner

SWEEP AUGER APPARATUS

BACKGROUND

Agriculture is one of the most hazardous industries in the United States. An area of particular concern within the agriculture industry relates to the removal of grain from a grain bin. While there are many aspects of grain removal that make the activity hazardous, the use of a sweep auger in grain bins has been a significant hazard for decades. The risk is such that hundreds of people have been killed and many thousands of farm workers have been seriously injured since the introduction of sweep augers.

In agriculture, a sweep auger is generally known as a mechanism that attaches to a pivot point in the center of a flat-bottom grain bin, and travels at very slow speeds pivoting around the bin. As the sweep auger travels, grain is moved from the perimeter of the bin towards a floor sump in the center of the bin by a helical screw blade called a fighting. Once the grain is moved to the floor sump, the grain exits to another conveying system. Due to challenges that occur with and imperfections of the sweep auger, frequently, one or more workers enter into the bin behind the sweep auger to make regular adjustments to the auger to keep it advancing on track, and also to manually sweep grain not captured by the auger.

By design, a sweep auger is typically guarded from accidental contact on the top and backside, but it cannot be guarded on the front, or the fighting of the auger would not be able to contact the grain, and therefore, would not convey grain towards the center sump. In other words, the basic functionality of a sweep auger would be nullified if it were guarded on all sides.

Due to the hazards inherent to an exposed rotating/rotatable blade working inside a grain bin, and in view of the factual evidence of continual worker injuries and deaths associated with those hazards, the regulatory governmental agency for Occupational Safety and Health Administration (OHSA) issued regulations regarding the procedures that are to be followed by an entity when workers are involved with clearing a grain bin. For example, in 1987, the Grain Handling Standard included a general requirement about equipment inside grain bins stating, "All mechanical, electrical, hydraulic, and pneumatic equipment which presents a danger to employees inside grain storage structures shall be deenergized and shall be disconnected, locked-out and tagged, blocked-off, or otherwise prevented from operating by other equally effective means or methods." In essence, the regulation restricted any worker from being in the grain bin while an auger was active. While the restriction surely improves safety, the restriction simultaneously created a host of complications for the industry. In particular, the amount of additional time and effort suddenly required in the process was significant if an entity was to remain in compliance with the regulation. Thus, the industry was left without any provision to address the use of sweep augers or the conditions in which an employee may work inside a grain bin with an energized sweep auger.

Over the years since the release of this regulation, many individuals and businesses have protested citations and made efforts to request additional guidance and/or changes to the regulations. Specifically, the industry requested that a determination be made to indicate what actions may be allowed and under what circumstances, in which an entity could permit a worker to be in the grain bin with an energized sweep auger. The efforts were mildly successful in that an exception was provided, subject to a list of explicit requirements. Nevertheless, due to both the difficulties involved with complying with the list of requirements and the absence of a viable alternative solution, frequently, individuals ignore the regulations and enter the bins, putting the entity as risk of an expensive citation and the safety of the individual, simply to get the work done.

A further complication to the issue above regards the era in which the grain bins were built. For example, the grain bins described above, having a built-in sweep auger, are bins that were built more recently. While there may be benefits to the more modern bins compared with older bins, sweep augers in the modern bins are not portable or readily transferable between different bins because they are fixed in a position to pivot within the bin. On the other hand, older bins, which either are unable to be or have not yet been retrofitted with a sweep auger, generally still require manual sweeping, which is more time-consuming than using a sweep auger and consequently less cost-efficient. Moreover, even without an energized sweep auger being used in the older grain bins, workers that have to enter the bins to manually remove the grain are still exposed to other hazardous situations including: suffocation, respiratory issues from the noxious gasses and particles released by the grain, injuries caused by falling or tripping over the grain, etc. Therefore, with or without a sweep auger in a grain bin, workers who enter the grain bin remain exposed to injury or death.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to an improved sweep auger apparatus. More particularly, the apparatus described herein is directed to a portable sweep auger apparatus that may be implemented to essentially eliminate the known hazardous human interactions with grain bin sweep augers.

As discussed above, conventional sweep augers are fixed in modern grain bins at a pivot joint in the center of the grain bins in order to sweep the bin in a circle and assist in moving the grain to the sumps in the sub floor. Such conventional sweep augers are therefore limited in use as they cannot be transported between bins. Furthermore, in the event that the auger malfunctions or becomes stuck, a worker must enter the bin to adjust the sweep auger manually, increasing the risk of harm to the worker and potentially violating governmental regulations for safety standards.

The sweep auger apparatus disclosed herein alleviates the above concerns by providing a sweep auger that is portable via mobile equipment, which eliminates the possibility that a worker needs to enter the bin while the sweep auger is energized, thereby completely avoiding potential violations of the governmental safety regulations; and provides a simple and satisfactory solution to the challenges and risks associated with manually clearing a grain bin, as faced by entities that maintain grain bins without fixed conventional sweep augers.

Moreover, the sweep auger apparatus disclosed herein may be implemented on different scales to the extent desired by the user. For example, in an embodiment, the sweep auger apparatus may be carried manually by a user and attached directly to a preconfigured mount on a remotely controlled mobile equipment, such as a remote controlled skid steer. Additionally, and/or alternatively, in another embodiment, the sweep auger apparatus of the instant application may be implemented in a sweep auger system, which may include attaching the sweep auger apparatus to a larger-scale, manually operable mobile equipment, such as a skid steer, via an arm apparatus. The arm apparatus may include a portion that extends and retracts to position the sweep auger apparatus at a fully rotational distance away from the body of the mobile equipment. The arm apparatus may further include a portion that raises and lowers the sweep auger apparatus from an elevated position to pass the sweep auger apparatus through an elevated portal on the outside of a grain bin, to a position adjacent to and substantially parallel with the horizontal plane at which the auger is able to engage the grain beneath the portal once inside the grain bin. Once in the lowered position, the operator of the mobile equipment may be able to activate the sweep auger apparatus to cause the auger to pivot around the grain bin and rotate the helical flighting of the auger to draw the grain toward the sump in the subfloor.

In general, and for health and safety purposes, the sweep auger apparatus and the arm apparatus may be actuated and energized via hydraulic systems including motors and cylinders.

Accordingly, additional non-limiting details regarding the sweep auger apparatus are discussed below.

Illustrative Embodiments of a Sweep Auger Apparatus and System

Figure 1:
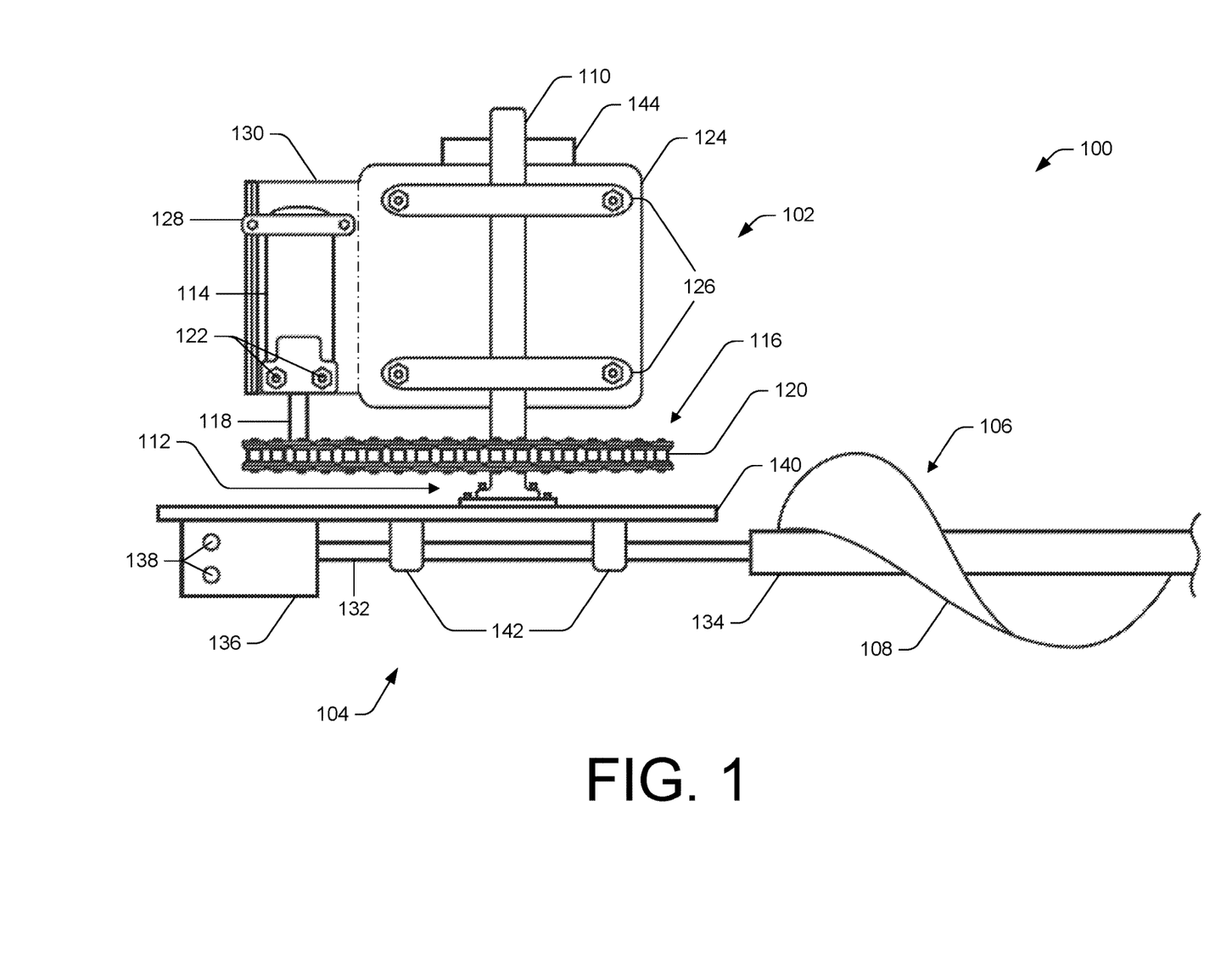
FIG. 1 illustrates a partial side view of a sweep auger apparatus according to an embodiment of the instant application.

FIG. 1 depicts an embodiment of a sweep auger apparatus 100 that may include an auger pivot portion 102 and an auger rotation portion 104. The auger pivot portion 102 includes components that create a pivot point at a first end (proximal end) of the sweep auger apparatus 100 and rotate the sweep auger apparatus 100 around the pivot point to move the sweep auger apparatus 100 around a grain bin. The auger rotation portion 104 includes components that cause an attached auger 106 to rotate so that a helical fighting 108 of auger 106 rotates to cause grain in the grain bin to move toward the sweep auger apparatus 100. In general use, a user (e.g., worker, employee) of sweep auger apparatus 100 positions the first end of sweep auger apparatus 100 over or near a sump in the floor of the grain bin to assist in removing the grain.

In an embodiment, auger pivot portion 102 may include, as depicted, a first rotatable shaft 110 having an axis therethrough about which auger 106 is pivotable. First rotatable shaft 110 may be attached to auger rotation portion 104 via a connection joint 112. In view of the potentially significant torque that may occur when auger 106 is being pivoted through grain, connection joint 112 may be formed in any suitable way to maintain a strong bond between auger pivot portion 102 and auger rotation portion 104. For example, connection 112 may be formed via welding or mechanical fasteners such as bolts, machine screws, etc. or a combination thereof.

First rotatable shaft 110 may be caused to rotate via a connection 114 with a first motor 116. Depending on a user's desires or needs, first rotatable shaft 110 may be indirectly caused to rotate via first motor 116 as depicted in FIG. 1, and/or may be directly caused to rotate via first motor 116 as depicted in FIG. 3, discussed in greater detail herein below. As depicted in FIG. 1, a motor shaft 118 extending from first motor 116 may have an indirect connection with first rotatable shaft 110 via a chain 120 secured on gears 202, 204 (shown in FIG. 2) connected to motor shaft 118 and first rotatable shaft 110, respectively. An indirect connection may permit a desired motor to be used for particular power needs and/or positional and/or size/dimensions reasons related to the bins in which the sweep auger apparatus 100 may be used, while also allowing the user to reduce or increase the gear ratio according to specific needs.

First motor 114 may be a hydraulic motor having ports 122 to which hydraulic fluid lines (not shown) may be connected to provide hydraulically driven pressure for rotating motor shaft 118, thereby causing first rotational shaft 110 to pivot auger rotation portion 104.

Figure 6:
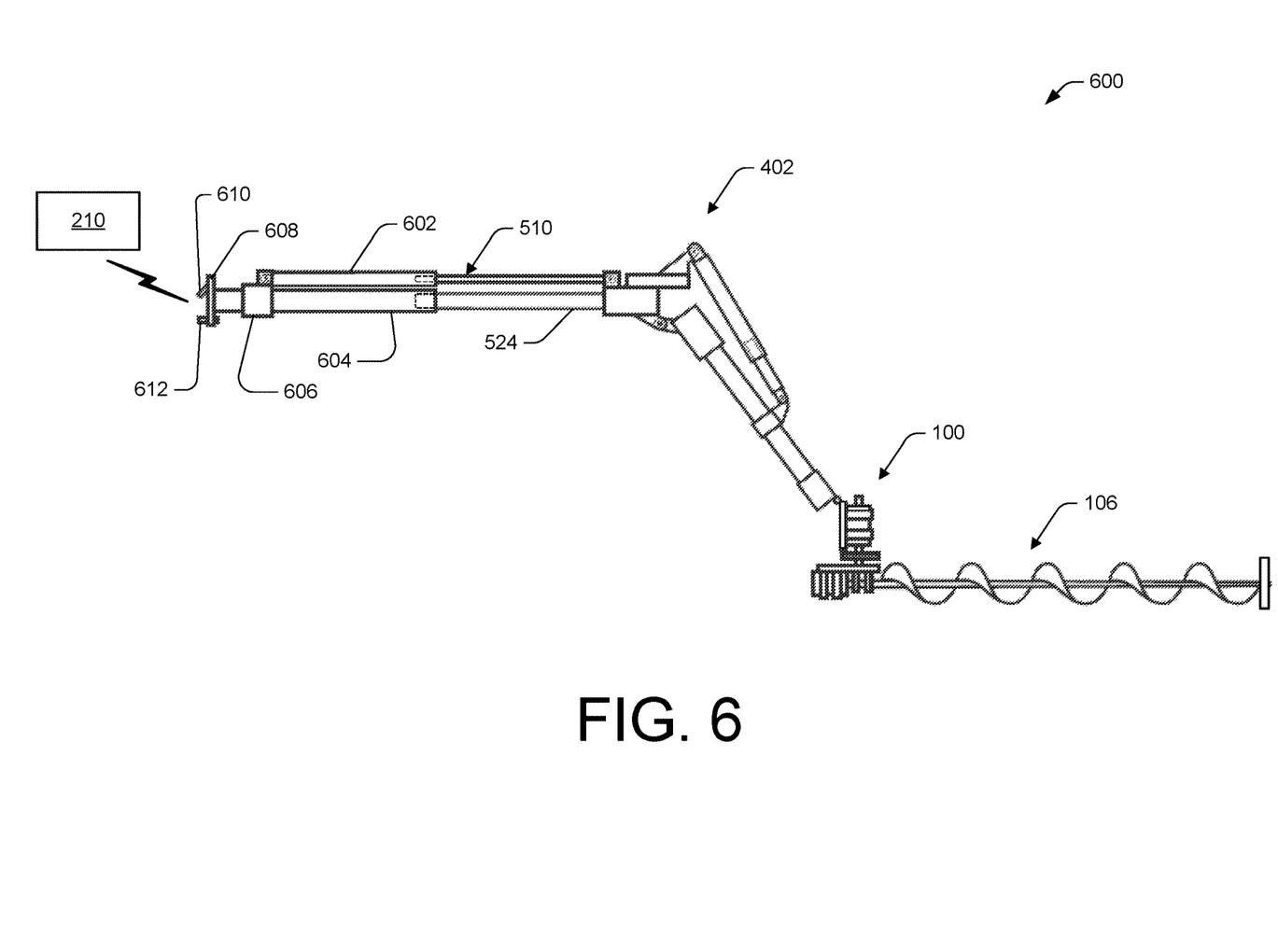
FIG. 6 illustrates a side view of a sweep auger apparatus attached to an arm apparatus according to an embodiment of the instant application.

Sweep auger apparatus 100 may further include an attachment member 124 to attach sweep auger apparatus 100 to mobile equipment (see FIG. 6). Inasmuch as the instant drawings show attachment member 124 as a plate-like component, attachment member 124 may also be referred to herein as "attachment plate." However, it is contemplated herein that attachment member 124 may be implemented in many different structural configurations, while still achieving the purpose of providing a support structure via which auger pivot portion 102 and auger rotation portion 104 may be attached to mobile equipment for portability.

Accordingly, first rotatable shaft 110 may be secured to attachment member 124. It is understood that mounting of first rotatable shaft 110 to attachment member 124 may be accomplished in a plurality of ways, including, for example, an embodiment in which an attachment member is designed to incorporate an integral securing structure (not shown). Additionally, and/or alternatively, first rotatable shaft 110 may mount to attachment member 124 via one or more discreet fasteners 126. In an embodiment, a fastener 126 may include a bushing clamp to secure first rotatable shaft 110 upright in a vertical position and substantially parallel to a plane of a facing surface of attachment plate 124 to create the vertical pivot point about which auger 106 may rotate.

FIG. 1 shows an implementation of a pair of vertically aligned bushing clamp fasteners 126, which, as a pair, may provide improved static and dynamic structural stability.

A fastener 128, such as a clamp, may be used to secure first motor 114 to attachment plate 124 as well. In a circumstance where first motor 114 includes integral attachment elements (not shown), such as for example integrated flanges having holes therethrough, first motor 114 may be connected to attachment plate 124 via bolts or other mechanical fasteners. Furthermore, as indicated by the dashed lines, first motor 114 may be alternatively or optionally secured to attachment plate 124 via a supplemental support portion 130 that is connected to attachment plate 124 at the dashed line. Nevertheless, as shown, the backing support to which first motor 114 is fastened may simply be a continuous portion of attachment member 124.

With respect to auger rotation portion 104, FIG. 1 shows a second rotatable shaft 132, on which auger 106 may be mounted for rotation. Auger 106 may be mounted onto second rotatable shaft 132 by sliding a hollow core 134 of auger 106 over second rotatable shaft 132. In an embodiment, a strong bond between core 134 of auger 106 and second rotatable shaft 132 may be achieved by a carbon fiber material (not shown) wrapped around second rotatable shaft 132 and covered in a shape-forming adhesive resin prior to sliding auger 106 onto second rotatable shaft 132. After the associated curing steps are followed for the chosen resin, auger 106 may be sufficiently secure to use.

Second rotatable shaft 132 may be rotated via a second motor 136. Like first motor 114, second motor 136 may be a hydraulic motor having ports 138 to which hydraulic fluid lines (not shown) may be connected to provide hydraulically driven pressure for rotating second rotatable shaft 132, thereby causing auger 106 to rotate about a longitudinal axis through second rotatable shaft 132.

Auger rotation portion 104 may further include an auger support member 140. Inasmuch as the instant drawings show auger support member 140 as a plate-like component, auger support member 140 may also be referred to herein as "auger support plate." However, it is contemplated herein that auger support member 140 may be implemented in many different structural configurations, while still achieving the purpose of providing a support structure via which auger pivot portion 102 and auger rotation portion 104 may be interconnected. For example, it is contemplated (though not shown) that auger support member 140 could be pivotably interconnected with attachment member 124.

Accordingly, as depicted in FIG. 1, first rotational shaft 110 may be attached to auger rotation portion 104 via connection joint 112 located on a first side of auger support plate 140, and second motor 136 and second rotatable shaft 132 may be secured to a second auger support plate 140. It is understood that mounting of second motor 136 and second rotatable shaft 132 to auger support member 140 may be accomplished in a plurality of ways, including, for example, an embodiment in which an auger support member is designed to incorporate an integral securing structure (not shown). Additionally, and/or alternatively, as shown, second rotatable shaft 132 may mount to auger support plate 140 via one or more discreet fasteners 142. In an embodiment, a fastener 142 may include a bushing clamp to secure second rotatable shaft 132 in a horizontally extended position and substantially parallel to a plane of a facing surface of auger support plate 140 to provide the horizontally-oriented axis about which auger 106 may rotate. FIG. 1 shows an implementation of a pair of horizontally aligned bushing clamp fasteners 142, which, as a pair, may provide improved static and dynamic structural stability. Though second motor 136 is depicted as being directly connected to auger support plate 140, it is understood that second motor 136 may be fastened to auger support plate 140 via a clamp like clamp 128.

As described above, attachment member 124 may provide a connection between sweep auger apparatus 100 and mobile equipment. Thus, in an embodiment, sweep auger apparatus 100 may include a hinge joint 144 disposed on attachment member 124. As discussed later herein, hinge joint 144 may be used as an intermediary connection element between mobile equipment indirectly, for example, to connect to an arm apparatus.

Figure 2:
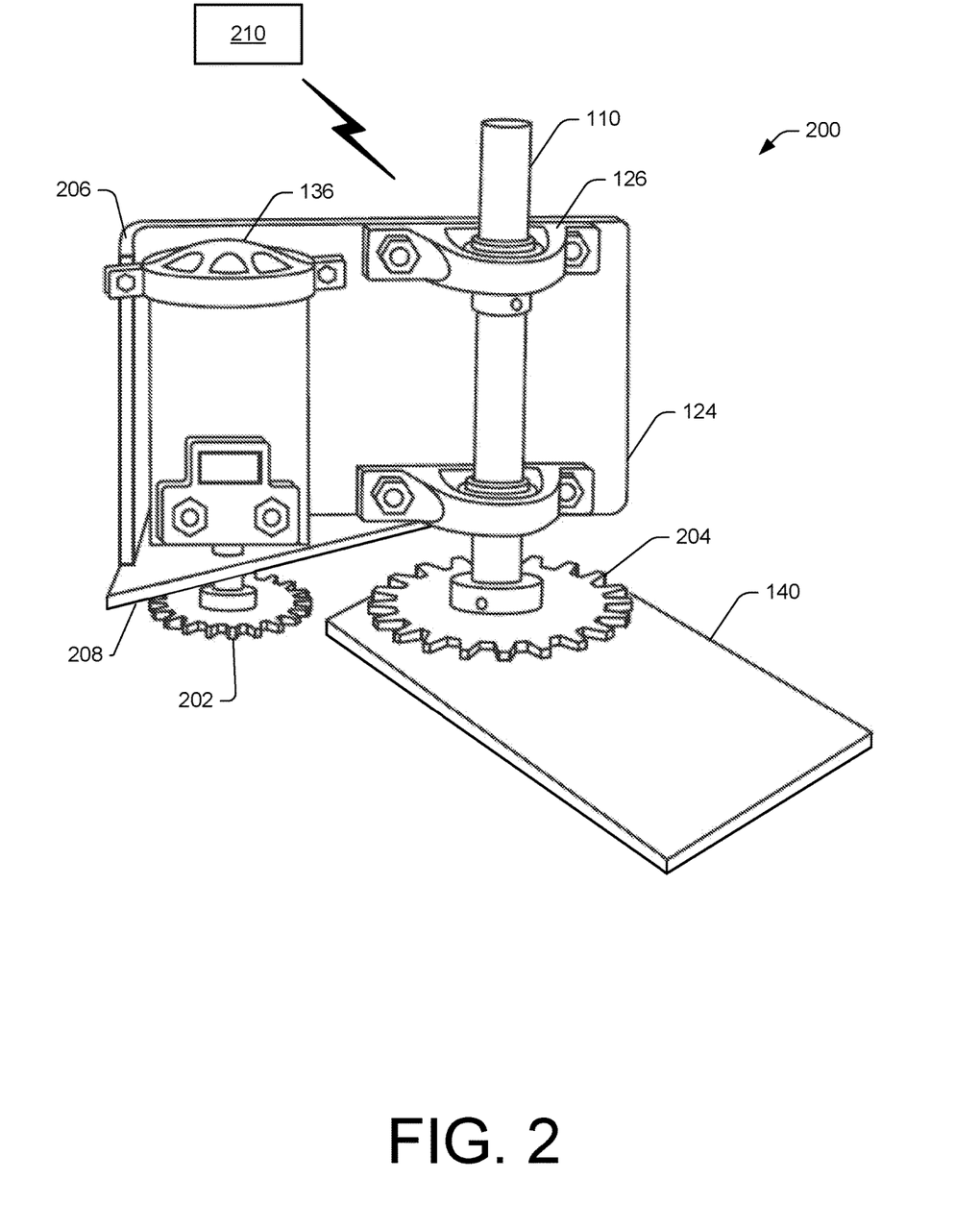
FIG. 2 illustrates a partial perspective view of a sweep auger apparatus according to an embodiment of the instant application
Figure 3:
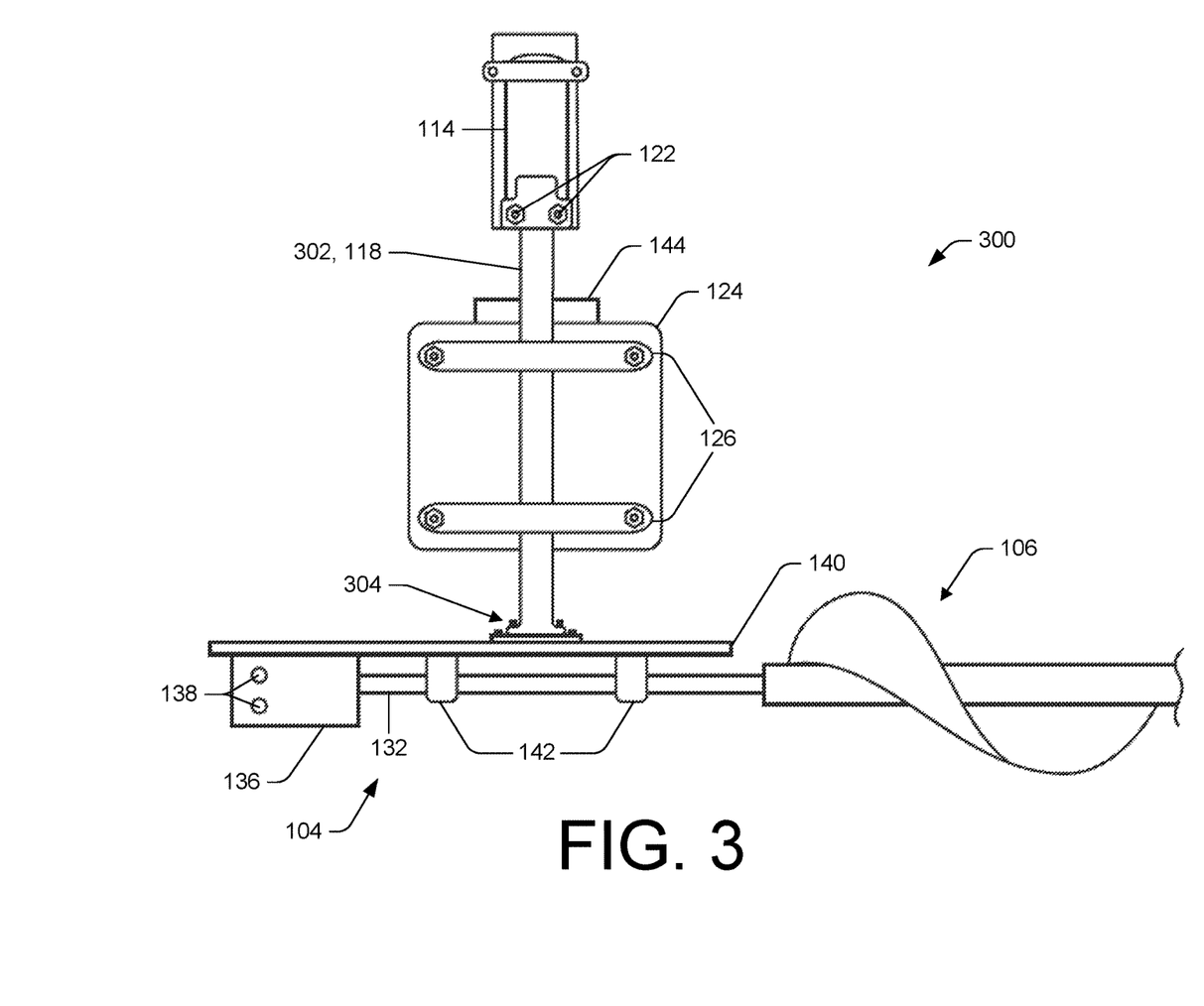
FIG. 3 illustrates a partial side view of a sweep auger apparatus according to an embodiment of the instant application.

In FIG. 2, a partial view of an embodiment of a sweep auger apparatus 200 is depicted. At least some of the distinctions from the embodiment of sweep auger apparatus 100, shown in FIG. 1, are discussed as follows.

As explained above, an indirect transfer of rotational power from first motor 136 to first rotatable shaft 110 may occur via chain 120 (not shown in FIG. 2 for clarity) on gears 202 and 204. Note, it is contemplated that, in an alternative embodiment, gear 204 may be disposed or directly connected to auger support member 140, thus forming a part of connection joint 112, as depicted in FIG. 2. Further, first motor 136 may be additionally supported by a wrap-around portion 206 of attachment member 124, as well as a lower support plate 208. Inasmuch as motor shaft 118 may extend through lower support plate 208, lower support plate 208 may serve as a brace and structural support for maintaining motor shaft 118 properly aligned with first motor 136 and in parallel with first rotatable shaft 110.

Furthermore, sweep auger apparatus 200 may be controlled via controller 210, which may be referred to as an auger control unit. For the purposes of simplicity in this disclosure, controller 210 may refer to: 1) the mobile equipment on which the sweep auger apparatus 200 may be attached for implementation; and 2) the control system associated with the chosen mobile equipment. Thus, the depicted zigzag lightning bolt extending between sweep auger apparatus 200 and controller 210 represents various types of "connection." A first type of connection is a physical connection (i.e., a structural/electrical connection) between mobile equipment and the control means therefor. A second type of connection is a control signal connection (e.g., wired or wireless control connection) to control/adjust the functions of sweep auger apparatus 200, while attached to the mobile equipment. That is, controller 210 may include a manually operated mobile equipment machine in which an operator sits and from which the operator can control both the machine and sweep auger apparatus 200 via a hardwired control system and user interface in the machine. Additionally, and/or alternatively, controller 210 may include a remotely controlled mobile equipment machine, the operation and controls of which may be accessed by a user remotely on a portable electronic device that has been programmed to control the machine to which the sweep auger apparatus 200 is connected, as well as the sweep auger apparatus 200.

As referenced above, FIG. 3 depicts an embodiment of a sweep auger apparatus 300 including first motor 114 oriented and disposed with respect to first rotatable shaft 118 such that a motor shaft 304 either functions as, or directly connects inline to, first rotatable shaft 118 to pivot auger rotation portion 104. In this embodiment, first rotatable shaft/motor shaft 118, 302 is connected directly via connection joint 304 to auger support member 140, without interruption from a gear or other obstruction.

Figure 4:
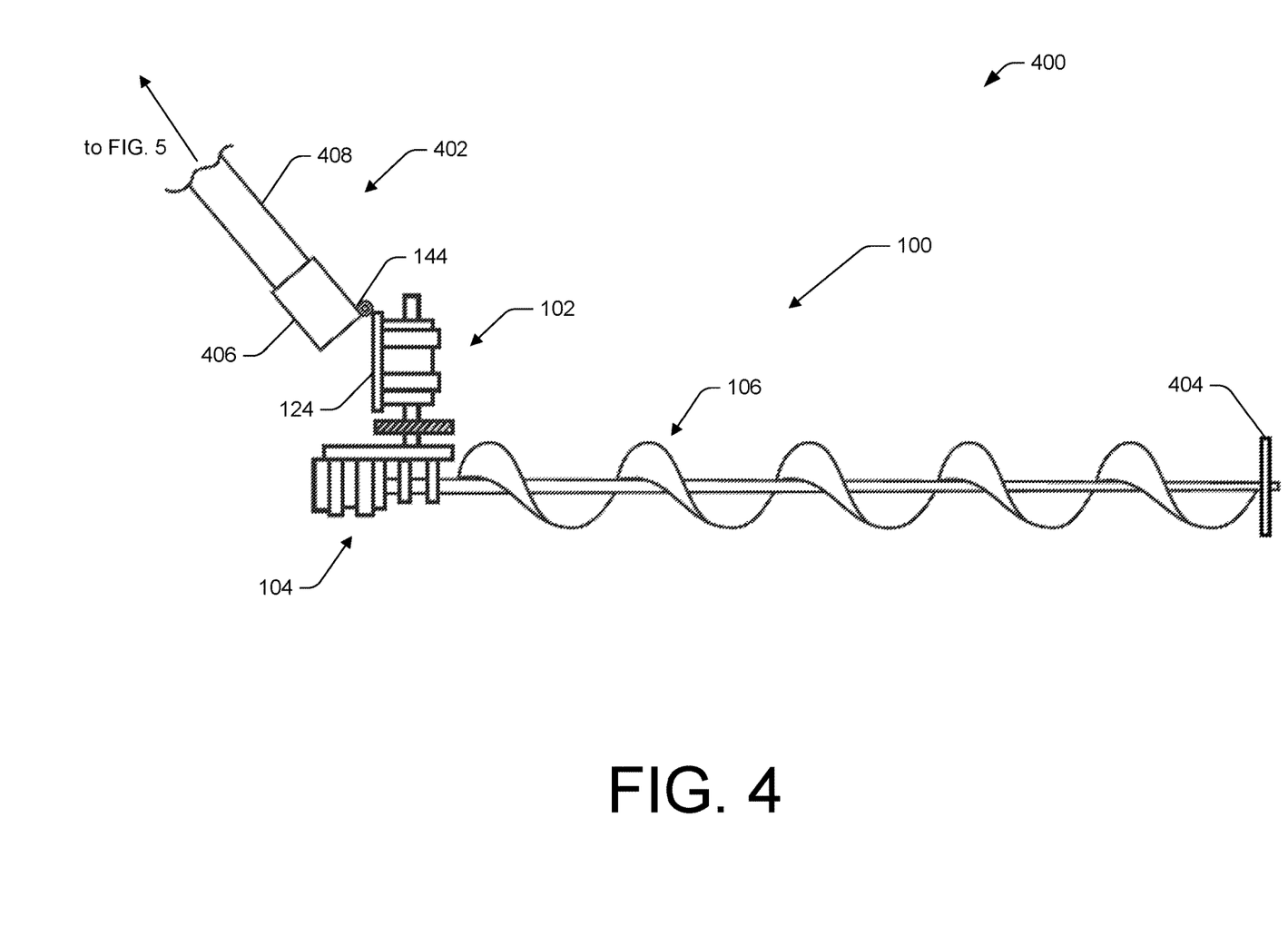
FIG. 4 illustrates a side view of a sweep auger apparatus attached to an arm apparatus according to an embodiment of the instant application.

In FIG. 4, a side view is shown of part of a sweep auger apparatus system 400. In an embodiment, sweep auger apparatus system 400 may include sweep auger apparatus 100, which is shown connected to arm apparatus 402 via hinge 144 located at a top edge of attachment member 124 of auger pivot portion 102. A wheel 404 is shown as attached to a distal end of auger 106. Wheel 404 is sized and positioned such that when sweep auger apparatus 100 is lowered to a horizontal position adjacent a grain surface or bin floor, wheel 404 supports the distal end of auger 106 to prevent auger 106 from dragging and creating additional friction and torque with the surface. Wheel 404 may be further sized to prevent the flighting of auger 106 from dragging on the surface. In an embodiment, wheel 404 may include a lightweight and low-friction material to glide easily through grain as sweep auger apparatus 100 is pivoted in the bin during use.

Arm apparatus 402 will be discussed in greater detail hereafter. However, it is noted that arm apparatus 402 may include a bracket 406 that engages with hinge 144 to function as a connection element for raising and lowering sweep auger apparatus 100. Bracket 406 may be secured to a bar 408 of a lowering section of arm apparatus 402. Additionally, and/or alternatively, bracket 406 may be fixed via hinge 144 to attachment member 124. In such an embodiment, bar 408 may be removably attachable to bracket 406 to facilitate simplified storage of sweep auger apparatus 100 or to facilitate transfer of sweep auger apparatus 100 to different mobile equipment, for example.

Figure 5:
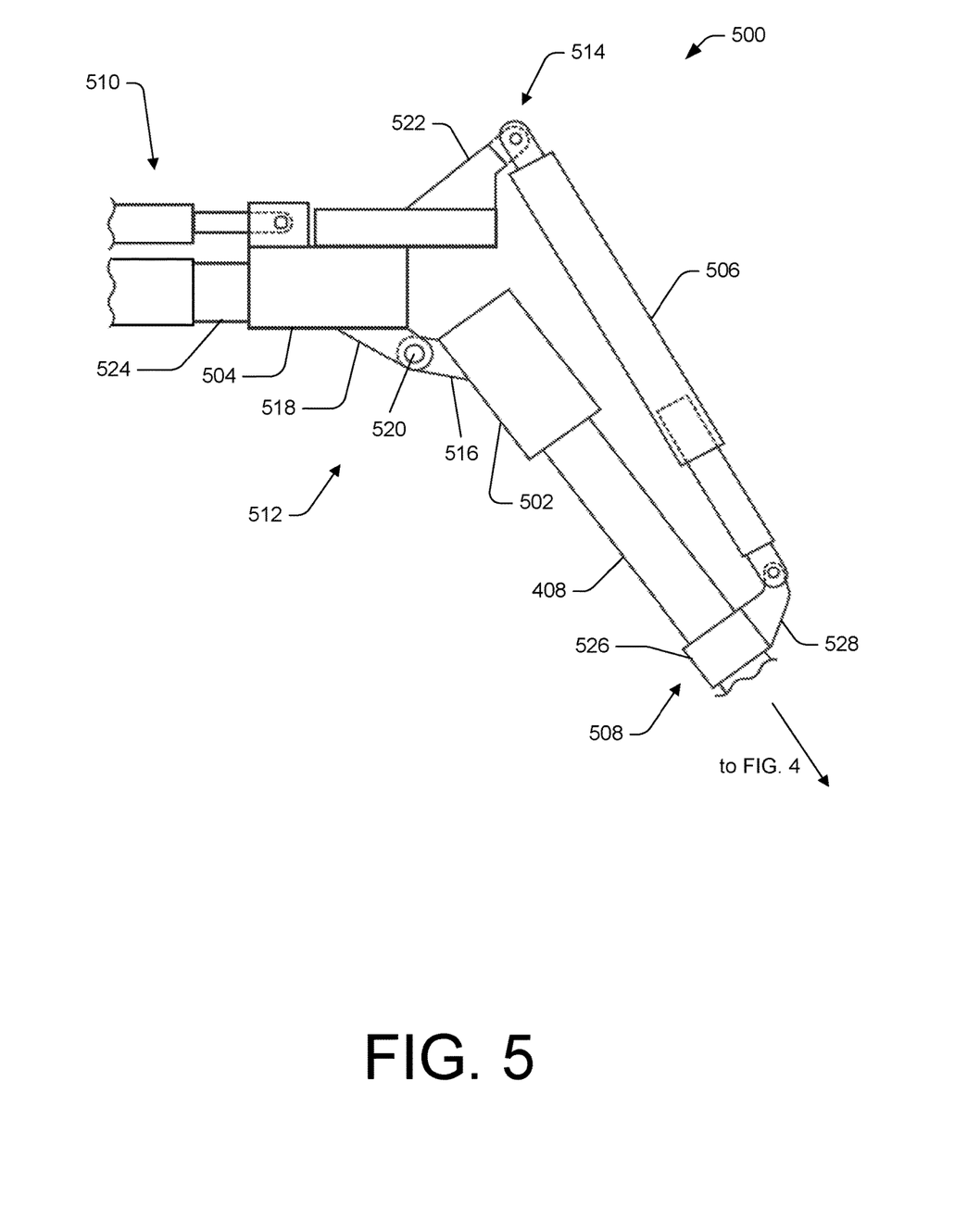
FIG. 5 illustrates a side view of a portion of an arm apparatus according to an embodiment of the instant application.

FIG. 5 depicts nearly an entirety of the lowering section 500 of arm apparatus 402. Thus, the arrow labeled "to FIG. 4" indicates that bar 408 extends to the cut-away section of bar 408 depicted in FIG. 4, and likewise the arrow labeled "to FIG. 5" in FIG. 4.

Lowering section 500 may include bar 408, first pivot joint bracket 502, second pivot joint bracket 504, hydraulic cylinder 506, and sliding joint bracket 508. First pivot joint bracket 502 may be disposed at a distal end of bar 408. Note, for the purposes of this disclosure, the terms "distal" and "proximal," used with respect to components of arm apparatus 402, refer to the respective ends of a component that is the most remote from or the closest to, a sweep auger apparatus. Lowering section 500 may attach to an extension section 510 (e.g., a boom) of arm apparatus 402 via a first connection joint 512 and a second connection joint 514.

First connection joint 512 may include: a first attachment flange(s) 516 that extends transversely away from first pivot joint bracket 502; a second attachment flange(s) 518 that extends transversely away from second pivot joint bracket 504, such that first attachment flange(s) 516 and second attachment flange(s) 518 extend to an overlapping intersection; and a pin 520 that passes through a hole located at the overlapping intersection in each of the first attachment flange(s) 516 and second attachment flange(s) 518, to unite first pivot joint bracket 502 to second pivot joint bracket 504.

Second connection joint 514 may include a partially pivotable pin joint, similar to first connection joint 512. Second connection joint 514 occurs between a distal end of hydraulic cylinder 506 and a third attachment flange(s) 522. Third attachment flange(s) 522 also extends transversely away from second pivot joint bracket 504, but on a side opposite that of second attachment flange(s) 518.

Furthermore, second pivot joint bracket 504, as depicted, is secured to a proximal end of a first extension bar 524 of extension section 510.

In an embodiment, as depicted in FIG. 5, sliding joint bracket 508 may include a slidable brace 526, which is slidably secured to bar 408, and a fourth attachment flange(s) 528, which extends away from and transversely to slidable brace 526. Sliding joint bracket 508 may be further connected to a proximal end of hydraulic cylinder 506 via a pin joint similar to connection joint 514. That is, fourth attachment flange(s) 528 extend to an overlapping intersection with the proximal end of hydraulic cylinder 506, where a pin joint may secure sliding joint bracket 508 to hydraulic cylinder 506. Thus, upon actuation of hydraulic cylinder 506, slidable brace 526 is forced to pass along bar 408 as restrained by first connection joint 512 and second connection joint 514, thereby guiding bar 408 between a position of linear alignment with first extension bar 524 and a position in which the direction of longitudinal extension of bar 408 is transverse to the direction of longitudinal extension of first extension bar 524.

In FIG. 6, a side view of a sweep auger system 600 is depicted in the fully extended and lowered position. In an embodiment, sweep auger system 600 may include auger 106 attached to sweep auger apparatus 100, which is connected to and controlled by mobile equipment 210 via arm apparatus 402. Extension section 510 may be controlled to extend or retract via actuation of a hydraulic cylinder 602. Actuation of hydraulic cylinder 602 causes first extension bar 524 to slide within a second extension bar 604. Maximum and minimum extensions are determined by a length of hydraulic cylinder 602 and a length of second extension bar 604. A proximal end of hydraulic cylinder 602 may be fixed in place to second pivot joint bracket 504, and the distal end of hydraulic cylinder 602 may be fixed in place to extension joint bracket 606.

Additionally, an arm support member 608 may be secured to extension joint bracket 606. Arm support member 608 may serve as a connection point for attaching sweep auger system 600 to mobile equipment controller 210. As such, in an embodiment, arm support member 608 may be secured to extension joint bracket 606 on a first side thereof and may include attachment features 610, 612 on a second side thereof. Attachment features 610, 612 may include elements such as hook-shaped features, machine hardware bolts, etc. or a combination thereof via which sweep auger system 600 may be removably secured to mobile equipment.

It is noted that a combined length of extension section 510, when unextended, and lowering section 500, when lowered, may be at least equivalent to a length of auger 106 to permit 360° of rotational freedom in a horizontal plane for pivoting auger 106.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:
1. A sweep auger apparatus, comprising:
an attachment plate having a first side and a second side, the first side having attachment features to removably attach the attachment plate to mobile equipment;
a first rotatable shaft secured to the second side of the attachment plate, a central axis of the first rotatable shaft extending in a first direction;

a first motor connected to the first rotatable shaft to cause the first rotatable shaft to rotate;

an auger support member connected to the first rotatable shaft so as to rotate with a rotation of the first rotatable shaft;

a second rotatable shaft secured to the auger support member, a central axis of the second rotatable shaft extending in a second direction that is transverse to the first direction; and a second motor connected to the second rotatable shaft to cause the second rotatable shaft to rotate, thereby rotating an auger.

2. The sweep auger apparatus according to claim 1, wherein the first motor is arranged to directly rotate the first rotatable shaft.

3. The sweep auger apparatus according to claim 1, wherein the first motor is arranged to indirectly rotate the first rotatable shaft.

4. The sweep auger apparatus according to claim 3, further comprising:

a first gear connected to the first motor; and a second gear connected to the first rotatable shaft and aligned with the first gear to cause the first rotatable shaft to rotate when the first gear rotates.

5. The sweep auger apparatus according to claim 1, wherein the first motor and the second motor are hydraulic motors.

6. The sweep auger apparatus according to claim 1, wherein the second motor is secured to a side of the auger support member opposite the first rotatable shaft.

\* \* \* \* \*